(12) United States Patent
Nakayama et al.

(10) Patent No.: US 8,344,530 B2
(45) Date of Patent: Jan. 1, 2013

(54) ENGINE STARTER AND RESISTOR SHORT-CIRCUITING DEVICE

(75) Inventors: Haruki Nakayama, Chiyoda-ku (JP);
Kazuhiro Odahara, Chiyoda-ku (JP);
Naohito Kaneda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 358 days.

(21) Appl. No.: 12/770,313

(22) Filed: Apr. 29, 2010

(65) Prior Publication Data

US 2011/0095545 A1   Apr. 28, 2011

(30) Foreign Application Priority Data

Oct. 28, 2009  (JP) ................... 2009-247659

(51) Int. Cl.
*F02N 11/00* (2006.01)
(52) U.S. Cl. .................................. 290/38 R
(58) Field of Classification Search ................ 290/38 R, 290/31, 36 A
See application file for complete search history.

(56) References Cited

U.S. PATENT DOCUMENTS

| | | | | |
|---|---|---|---|---|
| 2,373,256 | A | * | 4/1945 | Miller .......................... 290/38 R |
| 5,969,928 | A | * | 10/1999 | Hashimoto et al. ........... 361/106 |
| 6,054,818 | A | * | 4/2000 | Tabata et al. .................. 318/139 |
| 7,077,092 | B2 | * | 7/2006 | Senda et al. ................ 123/179.3 |
| 7,659,801 | B2 | * | 2/2010 | Kusumoto et al. ............ 335/126 |

FOREIGN PATENT DOCUMENTS

| | | |
|---|---|---|
| JP | 02-070979 A | 3/1990 |
| JP | 07-109967 A | 4/1995 |
| JP | 2003-173865 A | 6/2003 |
| JP | 2004-308645 A | 11/2004 |
| JP | 2005-105861 A | 4/2005 |
| JP | 2009-167967 A | 7/2009 |

OTHER PUBLICATIONS

Japanese Office Action, dated Oct. 25, 2011.

* cited by examiner

*Primary Examiner* — Tulsidas C Patel
*Assistant Examiner* — Viet Nguyen
(74) *Attorney, Agent, or Firm* — Sughrue Mion, PLLC

(57) ABSTRACT

Provided is an engine starter having a simple structure and excellent in stability and reliability, which starts an engine while preventing an occurrence of instantaneous interruption in an electrical device mounted in a vehicle. An engine starter for driving a starter motor by closing a starter switch 5 connected in series between a power source 3 and the starter motor 2 for receiving power supply from the power source to start an engine includes: a resistor 7 connected in series to the starter switch between the power source and the starter motor, for limiting a current flowing through the starter motor; and a short-circuiting switch 6 connected in parallel to the resistor, for short-circuiting both ends of the resistor by energization of a driving coil after start of an operation of closing the starter switch, and the resistor is made of a plate-like stainless steel.

8 Claims, 5 Drawing Sheets

ENGINE STARTER AND RESISTOR SHORT-CIRCUITING DEVICE

BACKGROUND OF THE INVENTION

1. Field of the Invention

The present invention relates to an engine starter for starting an engine with a starter motor and to a resistor short-circuiting device used for the engine starter.

2. Description of the Related Art

For starting an engine, a coil of a starter switch is energized to close an internal contact of the starter switch. In this manner, electric power is supplied from a vehicle power source to the starter motor to cause the starter motor to generate a rotary torque. A rotating force of the starter motor is transmitted to a crank shaft of the engine through an intermediation of a pinion gear and a ring gear which mesh with each other, thereby starting the engine. In this case, when the starter switch is closed, the starter motor is still in a static condition and a counter electromotive voltage is not generated. Therefore, a rush current of several hundreds to one thousand and several hundreds of amperes flows due to an extremely small internal resistance of the starter. At this time, a voltage drop, which is a reduction in terminal voltage due to an internal specific resistance of the vehicle power source, occurs in the vehicle power source.

Therefore, in starting the engine, there is a problem of instantaneous interruption occurring due to the voltage drop of the vehicle power source, which is caused by the current at the time of starting of the starter motor, when another electrical device provided in the vehicle, for example, a stereo, a navigation system, an air conditioner, or the like is used. The instantaneous interruption is not a particular problem in starting a normal engine. In a vehicle having an idle-stop function or the like, however, the instantaneous interruption occurs when the engine is restarted after the vehicle makes an idle-stop, bringing about a situation where a driver or a passenger in the same vehicle is made uncomfortable. Thus, in order to avoid the instantaneous interruption, measures of providing a standby power source, mounting a booster DC-DC converter, or mounting an electromagnetic switch for short-circuiting voltage drop suppression means are taken to prevent the voltage of the vehicle power source from dropping.

A conventional engine starter described in JP 2004-308645 A includes a motor, a starting resistance, a control element, and the like. The motor includes a series coil and a shunt coil. The starting resistance is connected in series to an armature of the motor. The control element controls a field current of the shunt coil. At the time of engine start, the motor is energized through an intermediation of the starting resistance. As a result, a starting current (rush current) flowing to the motor is reduced to suppress the voltage drop of a battery to 2 V or less. Moreover, a high-torque motor is employed, and hence a torque required for a piston to pass a first TDC position can be ensured even if the starting current of the motor is small. Further, after the piston passes the first TDC position, the field current of the shunt coil is controlled to obtain high rotation characteristics. As a result, the number of revolutions during cranking, which is required to start the engine, can be ensured. In this manner, the voltage drop exceeding 2 V is not brought about at the time of engine start, thereby enabling the engine start without the instantaneous interruption.

A conventional internal combustion engine starter disclosed in JP 2005-105861 A includes a DC motor, a capacitor, and an H-type controller. The DC motor is a compound-wound motor. The capacitor is connected in series to a shunt coil. The H-type controller performs switching between a first energization direction for charging the capacitor and a second energization direction for causing the capacitor to discharge charged power to the shunt coil. Then, at starting the DC motor, the energization is performed in the first energization direction. Then, at the time of starting of the DC motor, the energization direction is switched by the H-type controller from the first energization direction to the second energization direction. As a result, the voltage drop of a main power source which occurs with the start of the DC motor is compensated for, thereby ensuring a required torque of the starter. In this manner, the voltage drop of a main power source which occurs with the start of the DC motor is compensated for without increasing a capacity of the main power source nor boosting a voltage of the main power source with booster means. As a result, the starter without the instantaneous interruption is realized.

Further, a conventional starter described in JP 2009-167967 A includes an electromagnetic switch having voltage drop suppression means. The electromagnetic switch short-circuits the voltage drop suppression means. With this structure, after a current suppressed by the voltage drop suppression means is caused to flow through the motor, the voltage drop suppression means is short-circuited to apply a full voltage of the main power source to the motor. As a result, the voltage drop of the main power source which occurs with the start of the DC motor is suppressed without increasing the capacity of the main power source nor boosting the voltage of the main power source with the booster means, thereby realizing the starter without the instantaneous interruption.

In the engine starter disclosed in JP 2004-308645 A cited above, however, the starting resistance is connected to suppress the voltage drop at the time of engine start. Therefore, the controller for the switch which short-circuits the starting resistance is required. Moreover, the voltage drop at the time of engine start is monitored and controlled so as to be suppressed to 2 V or less, and hence the controller and the creation of a program are required for the control. As a result, an engine starter circuit disadvantageously becomes complex.

Moreover, in the internal combustion engine starter disclosed in JP 2005-105861 A cited above, in order to prevent the voltage drop at the time of starting of the DC motor, a method of compensating for the voltage drop of the main power source by charging the capacitor in advance and then causing the charged power to be discharged at the time of starting of the DC motor is used. Therefore, the capacitor having a large capacity, which is capable of accumulating necessary electric power as an auxiliary power source, and the H-type controller corresponding to means for switching the energization direction to allow the control element to perform switching between the charging and the discharging for the capacitor are additionally required. Thus, the starter circuit and the control become disadvantageously complex. Moreover, in an operating environment where starts and stops are required to be frequently repeated, the discharging is forced to be performed before the capacitor is sufficiently charged. As a result, there is a fear in that performance cannot be satisfactorily demonstrated.

Further, the voltage drop suppression means is included in the electromagnetic switch in the starter disclosed in JP 2009-167967 A cited above, and hence there is a fear in that cost is undesirably increased if the electromagnetic switches cannot be mass-produced by using conventional electromagnetic switches.

SUMMARY OF THE INVENTION

The present invention has been made in view of the problems described above, and has an object to provide an engine starter having a simple structure and excellent in stability and reliability, which starts an engine while preventing an occurrence of instantaneous interruption in an electrical device mounted in a vehicle without requiring a controller or an auxiliary power source nor changing a conventional electromagnetic switch, and a resistor short-circuiting device used for the engine starter, including voltage drop suppression means and a circuit for short-circuiting the voltage drop suppression means which are provided in an integrated manner.

According to the present invention, provided is an engine starter for driving a starter motor by closing a starter switch connected in series between a power source and the starter motor for receiving power supply from the power source to start an engine, including: a resistor connected in series to the starter switch between the power source and the starter motor, for limiting a current flowing through the starter motor; and a short-circuiting switch connected in parallel to the resistor, for short-circuiting both ends of the resistor by energization of a driving coil after start of an operation of closing the starter switch, in which the resistor is made of a plate-like stainless steel.

According to the present invention, the engine starter excellent in stability and reliability, which drives the starter motor for starting the engine while preventing the occurrence of instantaneous interruption of an electrical device mounted in a vehicle without requiring a complex controller or auxiliary power source nor changing a conventional electromagnetic switch, and the inexpensive resistor short-circuiting device used for the engine starter, including the voltage drop suppression means and the circuit for short-circuiting the voltage drop suppression means which are provided in an integrated manner may be provided.

DETAILED DESCRIPTION OF THE PREFERRED EMBODIMENTS

Hereinafter, an engine starter and a resistor short-circuiting device of the present invention are described according to each of embodiments with reference to the drawings. The same or equivalent components in the embodiments are denoted by the same reference symbols, and the overlapping description thereof is herein omitted.

First Embodiment

Figure 1:
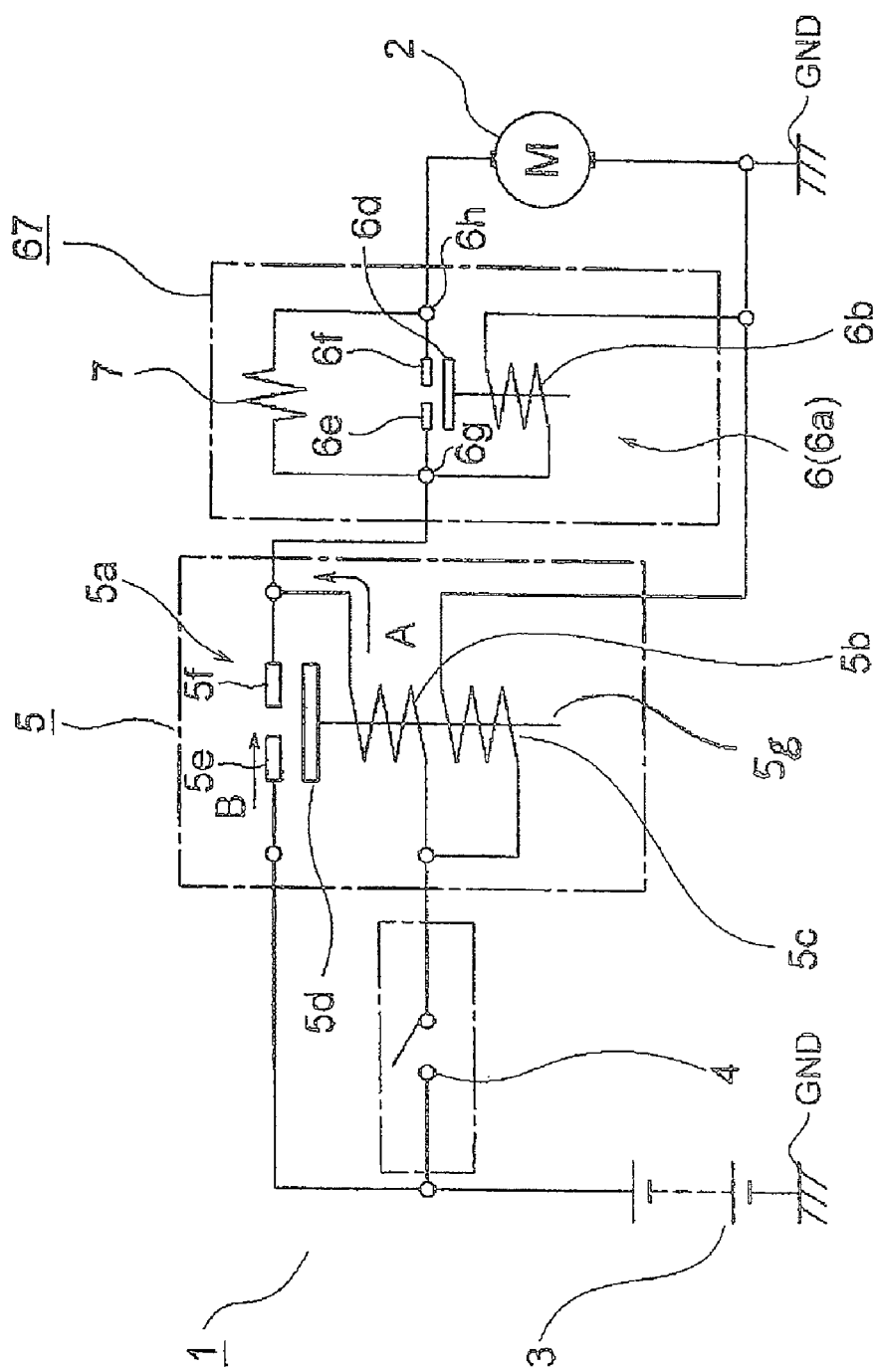
FIG. 1 is a circuit configuration diagram of an engine starter according to a first embodiment of the present invention.

FIG. 1 is a circuit configuration diagram of an engine starter according to a first embodiment of the present invention. In FIG. 1, an engine starter 1 includes a starter motor 2, a battery 3, a starting switch 4, a starter switch 5, a short-circuiting switch 6, and a resistor 7. The starter motor 2 starts an engine (not shown). The battery 3 is a power source for supplying electric power to the starter motor 2. The starting switch 4 for starting the starter motor 2 is connected to the battery 3. The starter switch 5 and the short-circuiting switch 6 are connected in series between the starter motor 2 and the battery 3. The resistor 7 is made of a plate-like stainless material, which is connected in parallel to the short-circuiting switch 6 between external electrodes 6g and 6h of the short-circuiting switch 6. The short-circuiting switch 6 and the resistor 7 constitute a resistor short-circuiting device 67.

The starter switch 5 includes an electromagnetic switch 5a. The electromagnetic switch 5a connects and disconnects a first fixed contact 5e connected to the battery 3 and a second fixed contact 5f connected to one end of each of the short-circuiting switch 6 and the resistor 7 by a moving contact 5d. The moving contact 5d is driven by a driving coil 5b and a holding coil 5c. One end of the driving coil 5b is connected to the battery 3 through an intermediation of the starting switch 4 which is closed at the time of driving of the starter motor 2, whereas another end of the driving coil 5b is connected to the second fixed contact 5f side. One end of the holding coil 5c is connected to the battery 3 through an intermediation of the starting switch 4, whereas another end of the holding coil 5c is connected to a ground (GND).

The short-circuiting switch 6 includes an electromagnetic switch 6a. The electromagnetic switch 6a connects and disconnects a first fixed contact 6e and a second fixed contact 6f by a moving contact 6d. The first fixed contact 6e is connected to the second fixed contact 5f of the starter switch 5, the another end of the driving coil 5b, and one end of the resistor 7, whereas the second fixed contact 6f is connected to another end of the resistor 7 and the starter motor 2. The moving contact 6d is driven by a driving coil 6b. One end of the driving coil 6b is connected to the first fixed contact 6e side, whereas another end of the driving coil 6b is connected to the GND.

Figure 2A:
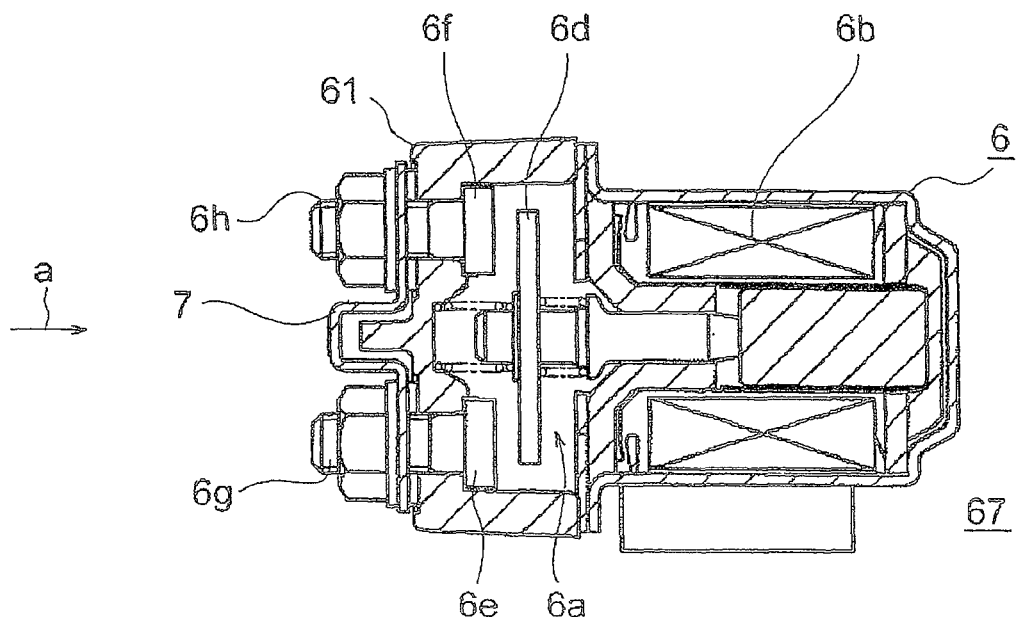
FIGS. 2A and 2B are views, each illustrating an example of an actual structure of a resistor short-circuiting device illustrated in FIG. 1.
Figure 2B:
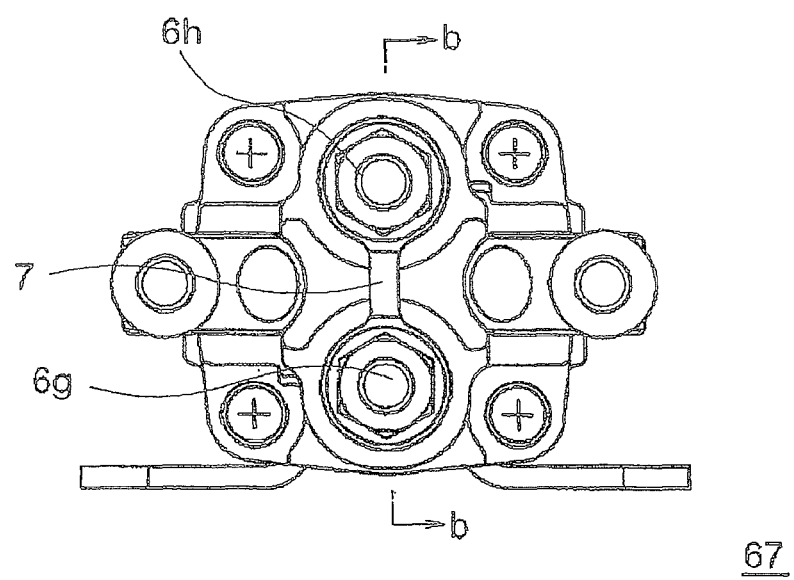

FIGS. 2A and 2B illustrate an example of an actual structure of the resistor short-circuiting device 67 illustrated in FIG. 1. FIG. 2A is a sectional view taken along a line b-b illustrated in FIG. 2B, whereas FIG. 2B is a top view as viewed from a direction indicated by an arrow a illustrated in FIG. 2A. The electromagnetic switch 6a of the short-circuiting switch 6 is housed in a terminal block 61. The first fixed contact 6e has an external electrode 6g, whereas the second fixed contact 6f has an external electrode 6h. The external electrodes 6g and 6h are exposed externally from the terminal block 61. The resistor 7 is connected between the external electrodes 6g and 6h outside the terminal block 61.

Figure 3:
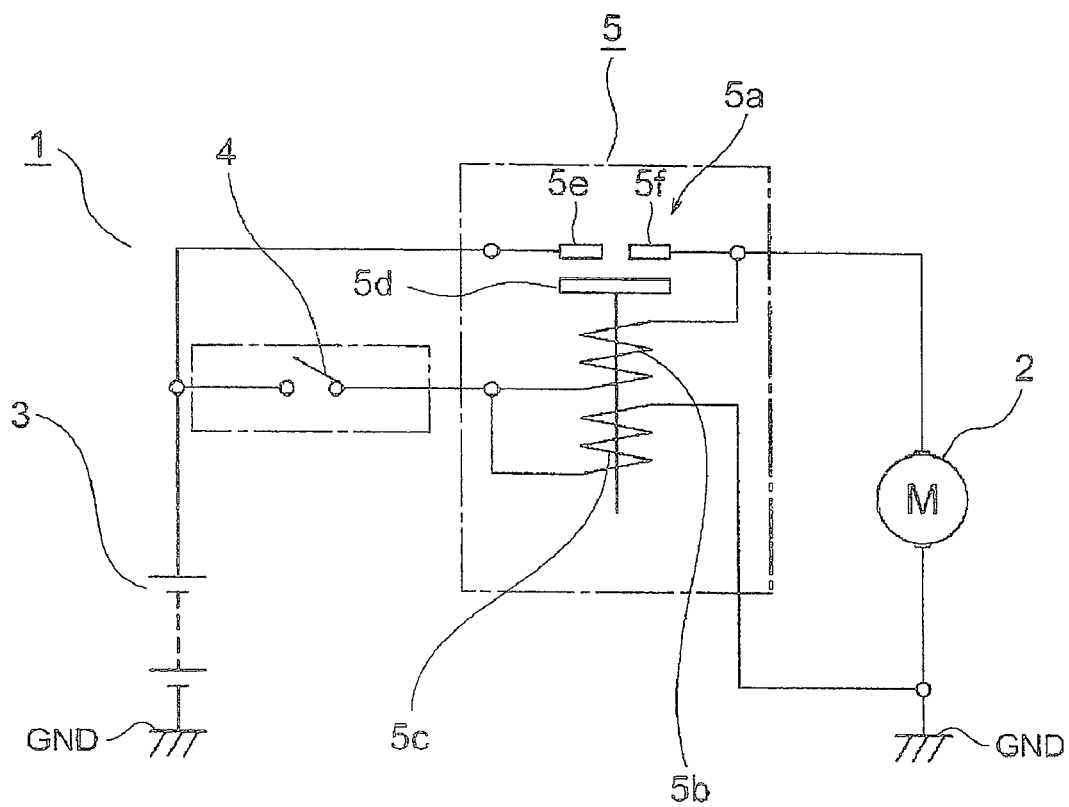
FIG. 3 is a circuit configuration diagram when the resistor short-circuiting device is not provided in the engine starter illustrated in FIG. 1.

FIG. 3 is a circuit configuration diagram in the case where the resistor short-circuiting device 67 is not provided in the engine starter illustrated in FIG. 1, and an operation in this case is described. In response to an engine start request, the starting switch 4 is closed. Then, when a current flows from the battery 3 through the starting switch 4 to the driving coil 5b of the starter switch 5, the moving contact 5d is brought into contact with the first fixed contact 5e and the second fixed contact 5f to connect the first fixed contact 5e and the second fixed contact 5f to each other. In this manner, the starter switch 5 is closed. As a result, the current is supplied from the battery 3 through the first fixed contact 5e, the moving contact 5d, and the second fixed contact 5f to the starter motor 2 to start the rotation of the starter motor 2. With the start of the starter motor 2, a high current flows. Therefore, a voltage of the battery 3 drops to result in possible occurrence of instantaneous interruption in an electrical device such as a navigation system. In a vehicle having an idle-stop function or the like, in particular, the instantaneous interruption occurs when engine restart is performed after an idle-stop is made.

Next, an operation of the engine starter according to the first embodiment of the present invention, which is illustrated in FIG. 1, is described. First, as a first step of the engine start, the starting switch 4 is closed in response to the engine start request. Then, a current A is supplied from the battery 3 through the starting switch 4 to the driving coil 5b of the starter switch 5. The current A further passes through the resistor 7 to be supplied to the starter motor 2.

Subsequently, as a second step, the driving coil 5b is energized to drive a plunger 5g of the starter switch 5. As a result, the moving contact 5d is moved toward the first fixed contact 5e and the second fixed contact 5f to be brought into contact therewith, thereby closing the starter switch 5. Here, the holding coil 5c is connected to the battery 3 through an intermediation of the starting switch 4. The closed state of the starter switch 5 is maintained by energization of the holding coil 5c. As a result, a rotary torque is generated by the starter motor 2. A pinion gear starts moving toward a ring gear provided to a crank shaft of the engine (not shown). When the starter switch 5 is closed, the current A flowing through the driving coil 5b almost disappears. Instead, a current B now flows from the battery 3 through the closed starter switch 5 and the resistor 7.

Further, as a third step, the driving coil 6b of the short-circuiting switch 6, which is connected in parallel to the resistor 7, is energized with the current B in place of the current A. As a result, the moving contact 6d is driven to be moved toward the first fixed contact 6e and the second fixed contact 6f to be brought into contact therewith. As a result, the short-circuiting switch 6 is closed to short-circuit both ends of the resistor 7. As a result of the short-circuiting of the resistor 7, the current B flowing through the resistor 7 almost disappears. Then, a normal starter current is supplied to the starter motor 2. A rotating force of the starter motor 2 is transmitted to the crank shaft of the engine to start the engine start operation.

A delay time period from the closure of the starting switch 4 to the closure of the short-circuiting switch 6 to short-circuit both ends of the resistor 7 is determined by a time period from the closure of the starter switch 5 to the achievement of a predetermined number of revolutions of the starter motor 2 after the current flows to the starter motor 2 through an intermediation of the resistor 7 to start the rotation of the starter motor 2. The predetermined number of revolutions is determined by an allowable amount of reduction in voltage. Specifically, if a target amount of reduction in voltage of the battery is allowed to be set large, the delay time period may be reduced. On the other hand, if the target amount of reduction in voltage is allowed to be set small, the delay time period may be increased. The allowable amount of reduction in voltage of the battery is required to be within a range which does not cause the instantaneous interruption in the electrical devices mounted in the vehicle. The delay time period and a resistance value of the resistor are set by an internal resistance of the battery, specifications (internal resistance) of the starter motor, wiring resistances, and the target engine.

In this case, a parallel circuit of an ignition key and a switch which is controlled by a control device (an ECU) is represented in a simplified manner as the single starting switch 4. The ignition key is to be turned by a driver at the time of first engine start. The switch is controlled by the control device at the time of engine restart in the case where the engine start request is generated after the idle-stop is made.

Further, a structure of the resistor short-circuiting device 67 illustrated in FIG. 2 is described. The electromagnetic switch 6a of the resistor short-circuiting device 67 in the present invention includes a conventional electromagnetic switch and the resistor 7 made of the plate-like stainless material. A specific resistance value of the stainless material is about forty times as large as that of a copper and about seven times as large as that of a steel material. Therefore, in comparison with the other materials, a resistance value required to suppress the voltage drop can be obtained with a smaller volume. As another material having a large specific resistance value, nickel chromium and iron chromium are cited. In comparison with nickel chromium and iron chromium, however, the stainless material has broader utility and therefore is advantageous in terms of cost. Moreover, the stainless material is excellent in anti-corrosion properties, and hence the stainless material is not particularly required to be subjected to surface processing even for use in an exterior environment. Therefore, even from such a point of view, the stainless material is advantageous in terms of cost.

Moreover, the resistor 7 is a component independent of the short-circuiting switch 6, and hence the resistor 7 can be externally provided between the external electrodes 6g and 6h of the short-circuiting switch 6 in a later step. With this structure, the conventional electromagnetic switch can be used as the short-circuiting switch. As a result, the electromagnetic switch (resistor short-circuiting device 67) including the resistor serving as the voltage drop suppression means and the short-circuiting circuit can be fabricated at low cost.

According to the first embodiment described above, the internal specific resistance of the battery 3, the resistance of the driving coil 5b, the resistor 7, the internal resistance of the starter motor 2, and each of the wiring resistances are present in the first step. The internal specific resistance of the battery 3, the resistor 7, the internal resistance of the starter motor 2, and each of the wiring resistances are present in the second step, whereas the internal specific resistance of the battery 3, the internal resistance of the starter motor 2, and each of the wiring resistances are present in the third step. Therefore, the electric resistance is reduced in three steps. Further, the starter motor 2 starts rotating by the currents A and B before the third step. As a result, a counter electromotive voltage of the starter increases to suppress the current. In this manner, even if an expensive controller or DC-DC converter is not specially used, the voltage drop of the battery can be suppressed without changing the conventional electromagnetic switch.

Further, at the time of starting of the starter motor, the resistor 7 provided between the battery 3 and the starter motor 2 is first energized. After a predetermined delay time period, the short-circuiting switch 6 is operated to short-circuit the resistor 7. As a result, the current at the time of starting of the starter motor is reduced to suppress the voltage drop. In this manner, a striking effect of enabling the engine start without causing the instantaneous interruption in the electrical devices mounted in the vehicle is obtained.

Second Embodiment

Figure 4:
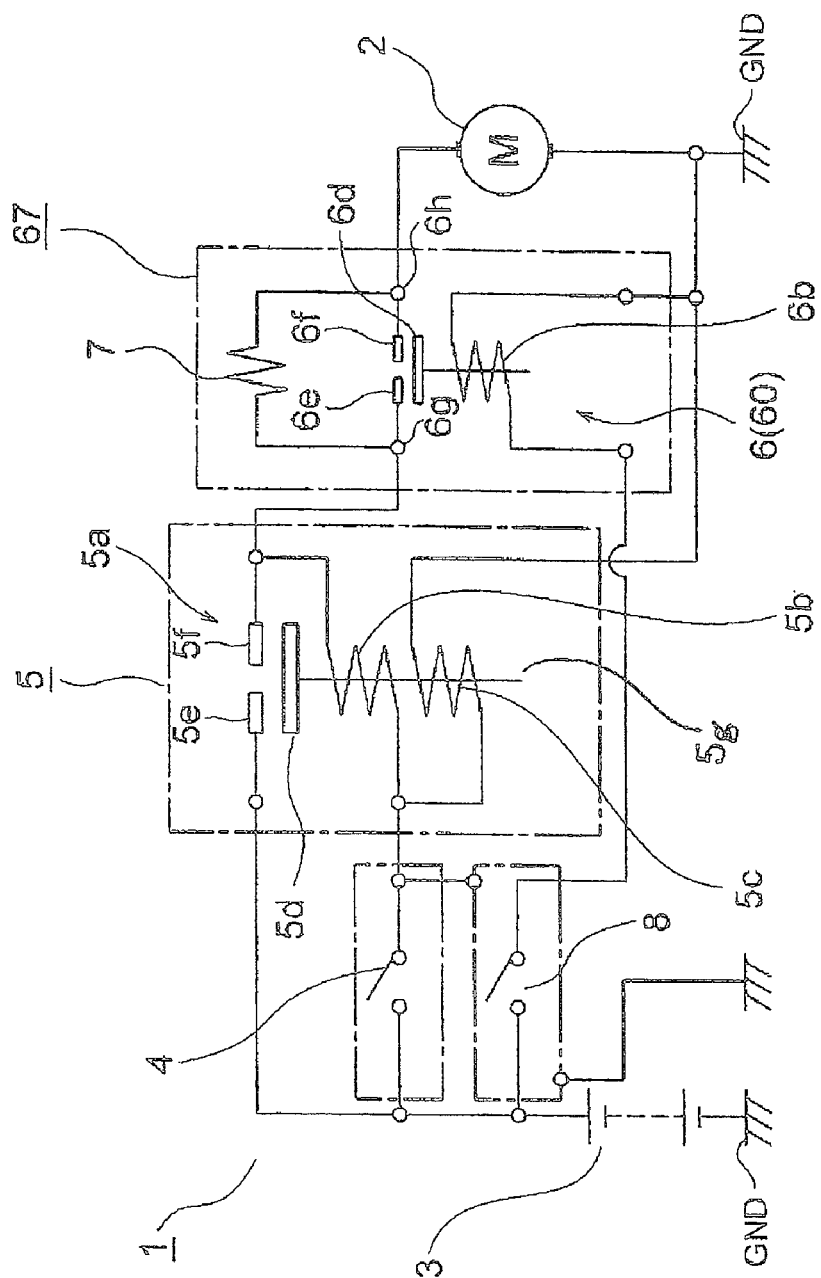
FIG. 4 is a circuit configuration diagram of the engine starter according to a second embodiment of the present invention.

FIG. 4 is a circuit configuration diagram of the engine starter according to a second embodiment of the present invention. In the engine starter illustrated in FIG. 4, an electromagnetic switch 60 of the short-circuiting switch 6 for short-circuiting the resistor 7 of the resistor short-circuiting device 67 is controlled by a control section 8 including, for example, an ECU or the like to supply the current for the driving coil 6b from the starting switch 4. Even in this case, the same effects as those obtained in the case where the current for the driving coil 6b is supplied from the first fixed terminal 6e side as in the engine starter illustrated in FIG. 1 can be obtained.

In the case of the engine starter illustrated in FIG. 4, the starter switch 5 has the same structure as that illustrated in FIG. 1. However, the short-circuiting switch 6 includes the electromagnetic switch 60 having the following structure in the second embodiment of the present invention. The electromagnetic switch 60 connects and disconnects the first fixed contact 6e and the second fixed contact 6f by the moving contact 6d. The first fixed contact 6e is connected to the second fixed contact 5f of the starter switch 5, the another end of the driving coil 5b, and the one end of the resistor 7, whereas the second fixed contact 6f is connected to the another end of the resistor 7 and the starter motor 2. The moving contact 6d is driven by the driving coil 6b. The one end of the driving coil 6b is connected to an output terminal of the control section 8, whereas the another end of the driving coil 6b is connected to the GND. The control section 8 is connected to the power source 3 and the starting switch 4 to supply the electric power, which is supplied from the power source 3, from the output terminal after elapse of a predetermined time period (after a predetermined delay time period) from the closure of the starting switch 4.

With such a circuit configuration, the delay time period from the closure of the starting switch 4 to the closure of the short-circuiting switch 6 to short-circuit both ends of the resistor 7 can be controlled by the control section 8. Therefore, the delay time period can be set without depending on the specifications of the starter motor or the like.

Third Embodiment

Figure 5A:
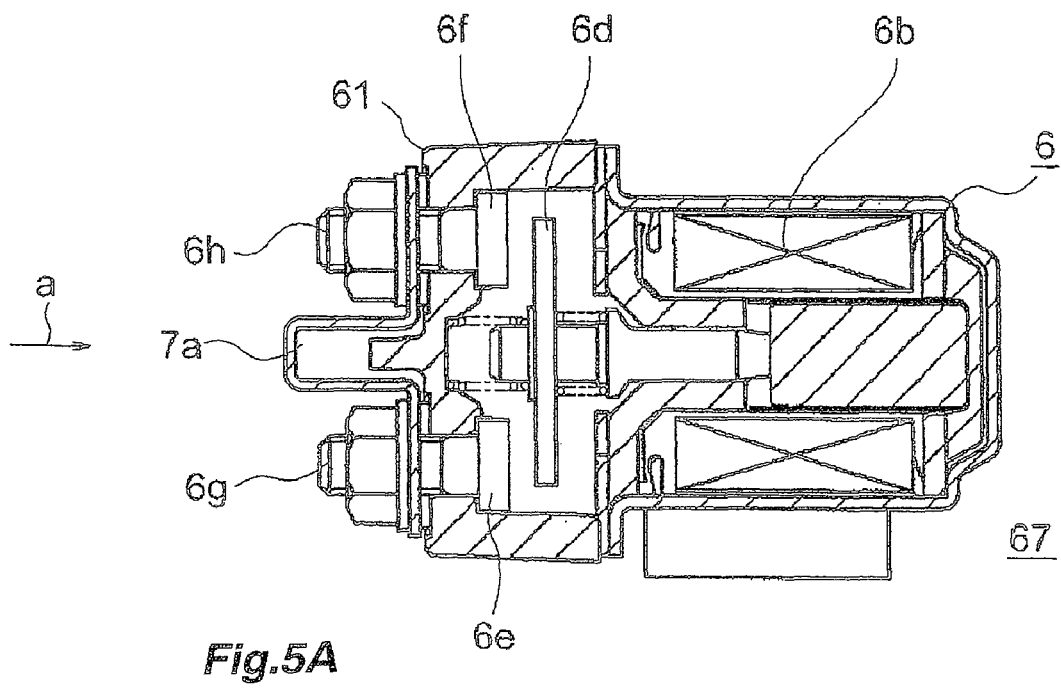
FIGS. 5A and 5B are views, each illustrating another example of the actual structure of the resistor short-circuiting device illustrated in FIGS. 1 and 4 according to a third embodiment of the present invention.
Figure 5B:
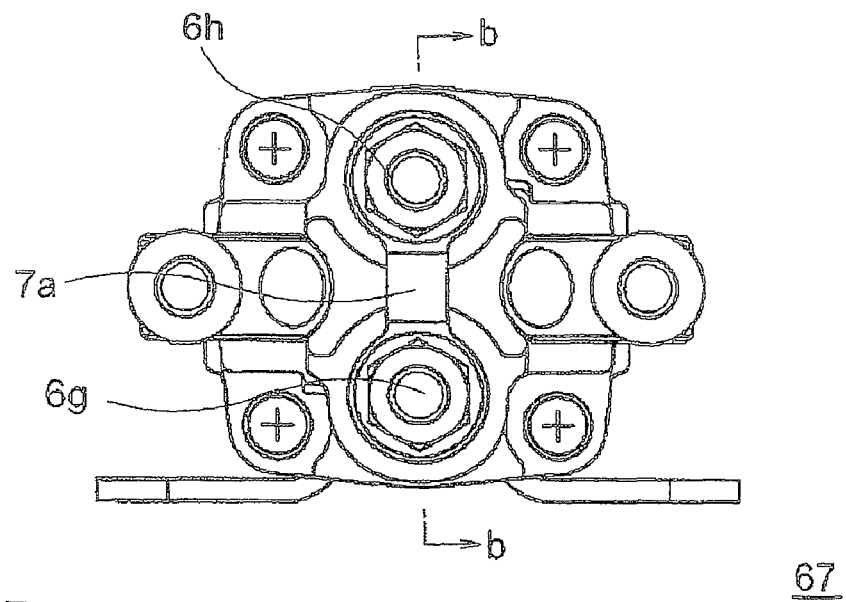

FIGS. 5A and 5B illustrate another example of the actual structure of the resistor short-circuiting device 67 illustrated in FIGS. 1 and 4. FIG. 5A is a sectional view taken along a line b-b illustrated in FIG. 5B, whereas FIG. 5B is a top view as viewed from a direction indicated by an arrow a illustrated in FIG. 5A. For setting the target amount of reduction in voltage of the battery 3 small, the resistance value of the resistor is required to be increased. In this case, as notably illustrated in FIG. 5A, the resistance value can be easily increased by increasing a total length of a resistor 7a. Moreover, when it is not necessary to set the target amount of reduction in voltage of the battery 3 small, the resistance value of the resistor can be reduced. In this case, as notably illustrated in FIG. 5B, the resistance value can be easily reduced by increasing a width of the resistor 7a. Alternatively, a thickness of the resistor 7a may be increased to reduce the resistance value. Specifically, the resistance value can be set by changing at least one of the length, the width, and the thickness of the resistor 7a.

Even in the cases described above, the resistor short-circuiting device 67 of the present invention can be mass-produced only by changing the resistor 7a but without changing the conventional electromagnetic switch.

As described above, in the present invention, the resistor corresponding to the voltage drop suppression means is made of the plate-like stainless material excellent in availability and in terms of cost. The resistor is externally provided between the external electrodes of the conventional electromagnetic switch. Then, at the time of starting of the starter motor, the resistor connected between the battery and the starter motor is first energized to start the engine start operation with a low current. After elapse of the predetermined delay time period, the short-circuiting switch is operated to short-circuit the resistor. In this manner, the voltage drop at the time of starting of the starter motor is suppressed to enable the engine start without causing the instantaneous interruption in the electrical devices mounted in the vehicle. In addition, the resistor short-circuiting device is configured by directly using the conventional electromagnetic switch (without changing the conventional electromagnetic switch), and hence the resistor short-circuiting device can be easily realized at low cost.

What is claimed is:

1. An engine starter for driving a starter motor by closing a starter switch connected in series between a power source and said starter motor for receiving power supply from said power source to start an engine, comprising:
   a resistor connected in series to said starter switch between said power source and said starter motor, for limiting a current flowing through said starter motor; and
   a short-circuiting switch connected in parallel to said resistor, for short-circuiting both ends of said resistor by energization of a driving coil after start of an operation of closing said starter switch,
   wherein said resistor is made of a plate-like stainless steel;
   wherein said starter switch includes an electromagnetic switch for connecting and disconnecting a first fixed contact connected to said power source and a second fixed contact connected to one end of each of said short-circuiting switch and said resistor by a moving contact driven by a driving coil and a holding coil, the driving coil having one end connected to said power source through an intermediation of a start switch closed at a time of driving of said starter motor and another end connected to a side of the second fixed contact, the holding coil having one end connected to said power source through an intermediation of the starting switch and another end connected to a ground; and
   wherein said short-circuiting switch includes an electromagnetic switch for connecting and disconnecting a first fixed contact connected to the second fixed contact of said starter switch, the other end of the driving coil, and the one end of said resistor and a second fixed contact connected to another end of said resistor and said starter motor by a moving contact driven by a driving coil having one end connected to a side of the first fixed contact and another end connected to the ground.

2. The engine starter according to claim 1, wherein:
   the electromagnetic switch of said short-circuiting switch is housed in a terminal block, and the first fixed contact of said short-circuiting switch and the second fixed contact of said short-circuiting switch respectively comprise external electrodes exposed externally from the terminal block; and
   said resistor is connected between the external electrodes outside the terminal block.

3. The engine starter according to claim 2, wherein a resistance value is set by changing at least one of a length, a width, and a thickness of said resistor.

4. The engine starter according to claim 1, wherein a resistance value is set by changing at least one of a length, a width, and a thickness of said resistor.

5. An engine starter for driving a starter motor by closing a starter switch connected in series between a power source and said starter motor for receiving power supply from said power source to start an engine, comprising:
   a resistor connected in series to said starter switch between said power source and said starter motor, for limiting a current flowing through said starter motor; and
   a short-circuiting switch connected in parallel to said resistor, for short-circuiting both ends of said resistor by energization of a driving coil after start of an operation of closing said starter switch,
   wherein said resistor is made of a plate-like stainless steel;
   wherein said starter switch includes an electromagnetic switch for connecting and disconnecting a first fixed contact connected to said power source and a second fixed contact connected to one end of each of said short-circuiting switch and said resistor by a moving contact driven by a driving coil and a holding coil, the driving coil having one end connected to said power source through an intermediation of a starting switch closed at a time of driving of said starter motor and another end connected to a side of the second fixed contact, the holding having one end connected to said power source through an intermediation of the starting switch and another end connected to a ground; and, wherein said short-circuiting switch includes an electromagnetic switch for connecting and disconnecting a first fixed contact connected to the second fixed contact of said starter switch, the other end of the driving coil, and the one end of said resistor and a second fixed contact connected to another end of said resistor and said starter motor by a moving contact driven by a driving coil having one end connected to an output terminal of a control section and another end connected to the ground, the control section being connected to said power source and the starting switch so as to supply electric power, which is supplied from said power source, from the output terminal after elapse of a predetermined time period from the closure of the starting switch.

6. The engine starter according to claim 5, wherein:

the electromagnetic switch of said short-circuiting switch is housed in a terminal block, and the first fixed contact of said short-circuiting switch and the second fixed contact of said short-circuiting switch respectively comprise external electrodes exposed externally from the terminal block; and said resistor is connected between the external electrodes outside the terminal block.

7. The engine starter according to claim 6, wherein a resistance value is set by changing at least one of a length, a width, and a thickness of said resistor.

8. The engine starter according to claim 5, wherein a resistance value is set by changing at least one of a length, a width, and a thickness of said resistor.

* * * * *